United States Patent
Pavlidis et al.

(10) Patent No.: US 10,867,437 B2
(45) Date of Patent: Dec. 15, 2020

(54) COMPUTER VISION DATABASE PLATFORM FOR A THREE-DIMENSIONAL MAPPING SYSTEM

(71) Applicant: HOVER INC., San Francisco, CA (US)

(72) Inventors: Ioannis Pavlidis, Redwood City, CA (US); Vineet Bhatawadekar, Mountain View, CA (US)

(73) Assignee: Hover Inc., San Francisco, CA (US)

( * ) Notice: Subject to any disclaimer, the term of this patent is extended or adjusted under 35 U.S.C. 154(b) by 244 days.

(21) Appl. No.: 15/959,684

(22) Filed: Apr. 23, 2018

(65) Prior Publication Data
US 2019/0035143 A1  Jan. 31, 2019

Related U.S. Application Data

(63) Continuation of application No. 14/303,126, filed on Jun. 12, 2014, now Pat. No. 9,953,459.

(60) Provisional application No. 61/834,157, filed on Jun. 12, 2013.

(51) Int. Cl.
G06T 17/05 (2011.01)
G06K 9/00 (2006.01)

(52) U.S. Cl.
CPC .......... *G06T 17/05* (2013.01); *G06K 9/00637* (2013.01)

(58) Field of Classification Search
None
See application file for complete search history.

(56) References Cited

U.S. PATENT DOCUMENTS

| 4,798,028 A | 1/1989 | Pinion |
| 5,973,697 A | 10/1999 | Berry et al. |
| 7,218,318 B2 | 5/2007 | Shimazu |
| 7,814,436 B2 | 10/2010 | Schrag et al. |
| 8,040,343 B2 | 10/2011 | Kikuchi et al. |
| 8,098,899 B2 | 1/2012 | Ohashi |
| 8,139,111 B2 | 3/2012 | Oldroyd |

(Continued)

FOREIGN PATENT DOCUMENTS

| WO | 2007147830 | 12/2007 |
| WO | 2011079241 | 6/2011 |
| WO | 2011091552 | 8/2011 |

OTHER PUBLICATIONS

Abdul Hasanulhakeem1; A tool to measure dimensions of buildings in various scales for Google Earth Plug-ins and 3D maps; Aug. 6, 2010; pp. 1-2; downloaded from Internet: [https://groups.google.com/forum/#topic/google-earth-browser-plugin/frlvZQ-m38l].

(Continued)

Primary Examiner — Jiangeng Sun

(57) ABSTRACT

A system is provided including a database that ingests data from disparate image sources, with a variety of image metadata types and qualities, and manages images geospatially through the creation and continued refinement of camera solutions for each data object included. These camera solutions are calculated and refined by the database as additional data enters the system that could affect the solutions, through a combination of the application of image metadata towards image processing methods and the use of optical-only computer vision techniques. The database continually generates data quality metrics and relevant imagery and geometry analytics, which drive future collection tasking, system analytics, and human quality control requirements.

18 Claims, 5 Drawing Sheets

(56) References Cited

U.S. PATENT DOCUMENTS

| | | | |
|---|---|---|---|
| 8,339,394 | B1 | 12/2012 | Lininger |
| 8,350,850 | B2 | 1/2013 | Steedly et al. |
| 8,390,617 | B1 | 3/2013 | Reinhardt |
| 8,909,563 | B1 | 12/2014 | Jing et al. |
| 9,478,031 | B2 | 10/2016 | Bhatawadekar et al. |
| 9,727,834 | B2 | 8/2017 | Reyes |
| 2002/0035569 | A1* | 3/2002 | Clark ............... G06F 9/465 |
| 2002/0062303 | A1* | 5/2002 | Fujihara ............ G06F 16/2246 |
| 2003/0014224 | A1 | 1/2003 | Guo et al. |
| 2003/0052896 | A1 | 3/2003 | Higgins et al. |
| 2004/0196282 | A1 | 10/2004 | Oh |
| 2005/0084154 | A1 | 4/2005 | Li et al. |
| 2006/0037279 | A1 | 2/2006 | Onchuck |
| 2006/0203261 | A1 | 9/2006 | Kacker |
| 2007/0168153 | A1 | 7/2007 | Minor et al. |
| 2008/0101723 | A1* | 5/2008 | Kansal ............. G06T 7/33 |
| | | | 382/284 |
| 2008/0221843 | A1* | 9/2008 | Shenkar ........... G06T 17/05 |
| | | | 703/1 |
| 2009/0043504 | A1 | 2/2009 | Bandyopadhyay et al. |
| 2009/0141020 | A1* | 6/2009 | Freund ............. G06T 17/05 |
| | | | 345/419 |
| 2009/0154795 | A1 | 6/2009 | Tan et al. |
| 2010/0045869 | A1 | 2/2010 | Baseley et al. |
| 2010/0074532 | A1 | 3/2010 | Gordon et al. |
| 2010/0110074 | A1 | 5/2010 | Pershing |
| 2010/0114537 | A1 | 5/2010 | Pershing |
| 2010/0214291 | A1 | 8/2010 | Muller et al. |
| 2011/0029897 | A1 | 2/2011 | Russell |
| 2011/0064312 | A1 | 3/2011 | Janky et al. |
| 2011/0128288 | A1* | 6/2011 | Petrou ............. G06F 16/434 |
| | | | 345/428 |
| 2011/0181589 | A1 | 7/2011 | Quan et al. |
| 2012/0120069 | A1 | 5/2012 | Kodaira et al. |
| 2013/0173603 | A1 | 7/2013 | Hamilton et al. |
| 2013/0195362 | A1 | 8/2013 | Janky et al. |
| 2013/0202157 | A1 | 8/2013 | Pershing |
| 2014/0212028 | A1 | 7/2014 | Ciarcia |
| 2016/0350969 | A1 | 12/2016 | Castillo et al. |

OTHER PUBLICATIONS

Wang, et al.; Large-Scale Urban Modeling by Combining Ground Level Panoramic and Aerial Imagery; IEEE Third International Symposium on 3D Data Processing, Visualization, and Transmission; Jun. 14-16, 2006; pp. 806-813.

Bansal, et al., "Geo-Localization of Street Views with Aerial Image Databases," Nov. 28-Dec. 1, 2011, pp. 1125-1128.

Becker, et al., "Semiautomatic 3-D model extraction from uncalibrated 2-D camera views," MIT Media Laboratory, 15 pages.

Caramba App Development, "EasyMeasure—Measure with your Camera on the App Store on iTunes", https://itunes.apple.com/us/app/easymeasure-measure-measure-your-camera/id349530105mt=8, 2 pages.

Chen, et al., "City-Scale Landmark Identification on Mobile Devices," pp. 737-744.

Fairfax County Virginia, "Virtual Fairfax," http://www.fairfaxcounty.gov/gis/virtualfairfax, Feb. 24, 2014; 2 pages.

Fruh and Zakhor, "Constructing 3D City Models by Merging Aerial and Ground Views," IEEE Computer Graphics and Applications, Nov./Dec. 2003, pp. 52-61, 10 pages.

Huang and Wu, et al., "Towards 3D City Modeling through Combining Ground Level Panoramic and Orthogonal Aerial Imagery," 2011 Workshop on Digital Media and Digital Content Management, pp. 66-71, 6 pages.

Jaynes, "View Alignment of Aerial and Terrestrial Imagery in Urban Environments," Springer-Verlag Berlin Heidelberg 1999, pp. 3-19, 17 pages.

Kroepfl, et al., "Efficiently Locating Photographs in Many Panoramas," Nov. 2-5, 2010, ACM GIS10.

Lee, et al., "Automatic Integration of Facade Textures into 3D Building Models with a Projective Geometry Based Line Clustering," Eurographics 2002, vol. 2, No. 3, 10 pages.

Lee, et al., "Integrating Ground and Aerial Views for Urban Site Modeling," 2002; 6 pages.

Ou et al., "A New Method for Automatic Large Scale Map Updating Using Mobile Mapping Imagery", Sep. 2013, Wiley Online Library, vol. 28, No. 143, pp. 240-260.

Pu et al., "Automatic Extraction of Building Features From Terrestrial Laser Scanning," International Institute for Geo-Information Science and Earth Observation, 5 pages.

Scale Area Measurement; http://www.geog.ucsb.edu/~jeff/115a/lectures/scale_and_area_measurement.html, 8 pages.

Scope Technologies; Solutions; Mar. 4, 2014; pp. 1-2, downloaded from the internet: [http://www.myscopetech.com/solutions.php].

Xiao, et al., "Image-based Facade Modeling," ACM Transaction on Graphics (TOG), 2008, 10 pages.

SketchUp Knowledge Base, Tape Measure Tool: Scaling an entire model, http://help.sketchup.com/en/article/95006, 2013 Trimble Navigation Limited, 2 pages.

* cited by examiner

COMPUTER VISION DATABASE PLATFORM FOR A THREE-DIMENSIONAL MAPPING SYSTEM

CROSS-REFERENCE TO RELATED APPLICATIONS/INCORPORATION BY REFERENCE

The present U.S. Utility patent application claims priority pursuant to 35 U.S.C. § 120 as a continuation of U.S. Utility application Ser. No. 14/303,126, entitled "Computer Vision Database Platform for a Three-Dimensional Mapping System," filed Jun. 12, 2014, scheduled to issue as U.S. Pat. No. 9,953,459 on Apr. 24, 2018, which claims priority pursuant to 35 U.S.C. § 119(e) to U.S. Provisional Application No. 61/834,157, entitled "Computer Vision Database Platform for a Three-Dimensional Mapping System," filed Jun. 12, 2013, both of which are hereby incorporated herein by reference in their entirety and made part of the present U.S. Utility patent application for all purposes.

The present application is related to the following:

1. U.S. Utility application Ser. No. 13/624,816 entitled, "Three-Dimensional Map System," filed Sep. 21, 2012, now U.S. Pat. No. 8,878,865, and 2. U.S. Utility application Ser. No. 12/265,656, entitled, "Method and System for Geometry Extraction, 3D Visualization and Analysis Using Arbitrary Oblique Imagery," filed Nov. 5, 2008, now U.S. Pat. No. 8,422,825.

Both applications are hereby incorporated herein by reference in their entirety and made part of the present application for all purposes.

BACKGROUND

Technical Field

This invention relates generally to a system for managing geospatial imagery, and in particular to a system and method for processing geospatial imagery for three-dimensional registration and any number of two-dimensional and three-dimensional image processing analytic pipelines.

Description of Related Art

Location-based technologies and mobile technologies are often considered the center of the technology revolution of this century. Essential to these technologies is a way to best present location-based information to devices, particularly mobile devices. The technology used to represent this information has traditionally been based on a two dimensional (2D) map.

Some efforts have been made to generate a three-dimensional (3D) map of urban cities via aerial imagery or specialized camera-equipped vehicles. However, these 3D maps have limited texture resolution and geometry quality, are difficult to update and provide no robust real-time image data analytics for various consumer and commercial use cases.

DETAILED DESCRIPTION

Figure 1:
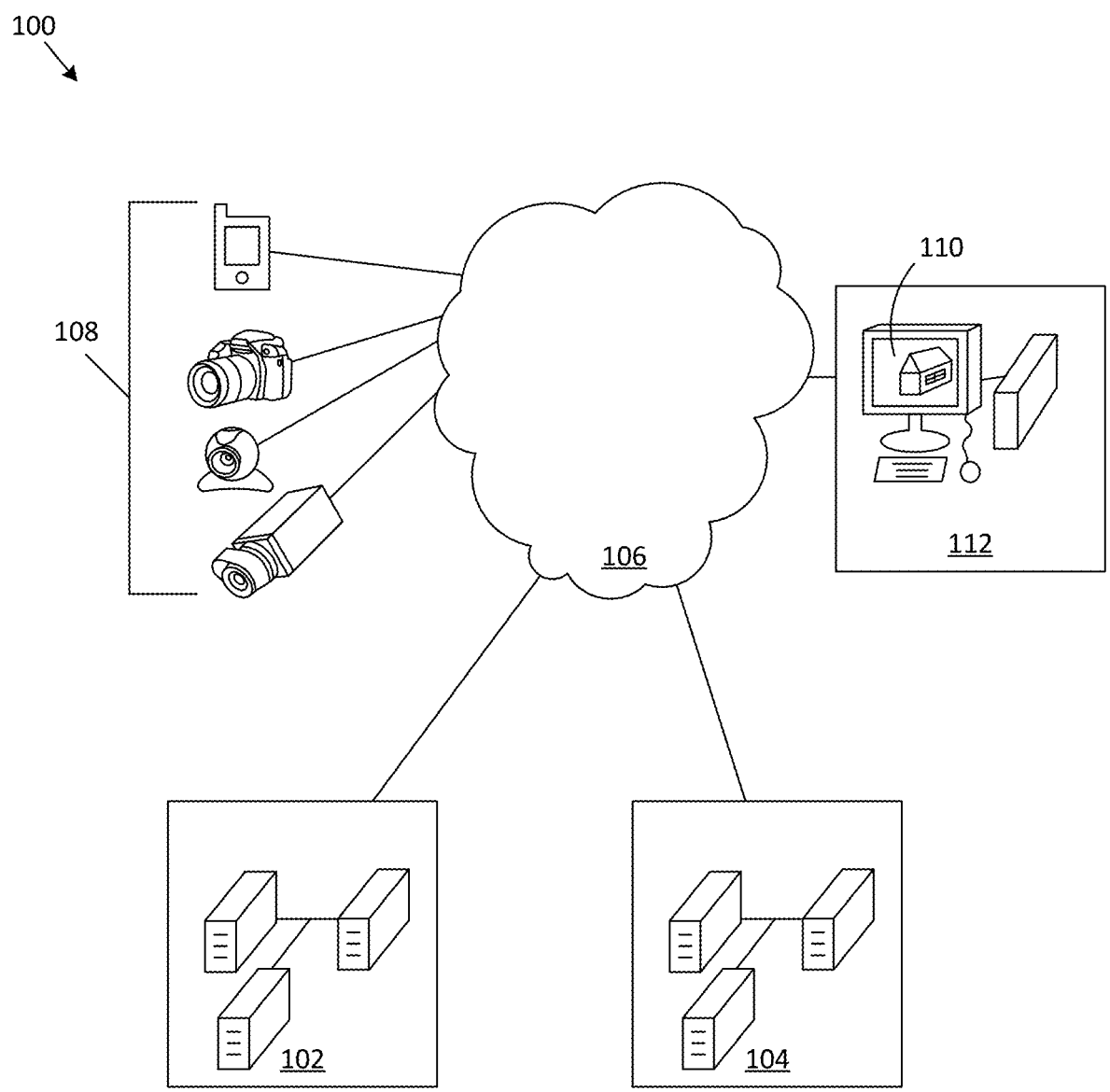
FIG. 1 illustrates one embodiment of a system architecture of a three-dimensional map system.

In various embodiments, a system provides for a platform for storing, accessing, displaying, manipulating, updating and editing various 3D map elements. 3D map elements, include, but are not limited to, 3D building models with textures and facade mapped surfaces. The 3D building model is representative of a physical building in the real-world. In some embodiments, a map generation system is provided that selects a 3D building model corresponding to a physical building in the real-world based on one or more uploaded images. An uploaded image is, for example, a photograph of a physical building. In other embodiments, the uploaded image includes a facade of the physical building. In alternative embodiments, the uploaded image is mapped as a facade of the building model.

In one embodiment, the method of mapping an uploaded image to a building model includes: receiving an image and a geo-location tag of the image; determining a building model for a list of potential physical buildings corresponding to an object in the image based on the geo-location tag; mapping, on a region-by-region basis, the image to a stored facade of the building model; and mapping, on a pixel-by-pixel basis, the image to the stored facade of the building model for displaying the image as a new facade of the building. In one embodiment, a ranked certainty for which 3D building object resides in the image is determined to create an exact registration of pixels from the collected image into then existing 3D building model. In another embodiment, the method further includes processing the image to remove an obstruction object.

Performing the region-by-region mapping before the pixel-by-pixel mapping has the advantage of ensuring "global match" for regional features of the building objects, and removing false negatives that would result from a pixel-to-pixel only approach to building façade matching and registration. For example, if the owner of a building has done some remodeling to the physical building, any new photographs of the new building are mapped to the building model, due to the regional similarities between the façade residing in the image and the façade(s) associated with the 3D building object, with the remodeled region highlighted as a changed region.

Once a building model has been selected to correspond to the uploaded image, the uploaded image is registered to the image(s) associated with that 3D model of the building. In one embodiment, points in the uploaded image are matched accurately to points in the database. Full 3D mapping of the uploaded image as a facade of the building in the physical world is accomplished. In some embodiments, the 3D building model in the 3D map is thus re-textured and refined based on the uploaded image.

In one embodiment, images uploaded to the system are processed either fully automatically, semi-automatically or automatically based on machine learning techniques. In some embodiments, the images uploaded are curated by users themselves or at a trained analyst terminal regularly. In one embodiment, the semi-automated approach fixes geometry errors and inconsistencies. Three-dimensional texture data not directly extracted by automated algorithms is manually processed. In other embodiments, the removal of objectionable content is also processed automatically or semi-automatically in the same way as fixing texturing errors and inconsistencies.

A 3D map provides advantages over a two-dimensional (2D) map. For example, a 3D map includes accurate representations of buildings in a city. In some embodiments, these representations are used to deliver information to users who view the map. In one embodiment, these representations include a display of the building facade to a viewer of the 3D map. The facade is appended to the 3D model using similar techniques to those used in creating the building representation. In one embodiment, the user uploads a facade image to the 3D map system. The 3D map system selects the building and the side of the building with which the image corresponds. The 3D map system then identifies a pixel-to-pixel correlation between the building façade in the incoming image and the building façade image(s) associated with the existing 3D model. In alternative embodiments, the 3D map system then submits the image to a render module of the 3D map system. The system then assimilates the collected image into the model and displays the correct portion(s) of the uploaded image as the façade(s) of the building(s).

In other embodiments, the building model selection is done semi-automatically, such as having the user make some or all of the selections. Also in some embodiments, some or all of the corner matching process is done semi-automatically. In another embodiment, if the image uploaded by the user includes geo-location data, the system determines generally what building the image corresponds to and makes recommendations to the user based on the location data, thereby making the upload process semi-automatic. With semi-automatic geo-location information associated with the street level image of the facade in question, the computer vision engine determines through a combination of logic modules and computer vision algorithms the 3D building model in question, then automatically registers the collected image to the image(s) already associated with the façade of the 3D building model, creating a fully automated process—from crowd-sourced image to updated 3D model facade.

This process of allowing users to upload facade images can provide a near real-time photographic representation of a city. This is an advantage to a user who is looking at a restaurant or residential property, for example, and the latest image of the building facade was recently updated. In one embodiment, if the user sees a line formed outside of the restaurant in the recently (seconds, minutes, hours) uploaded image, the user takes that into consideration when making a decision whether to visit the restaurant or not. In another embodiment, if the user sees that the most recent texture of the façade of the 3D model of a residential property shows chipped paint on building siding, the user takes that into consideration when she is a potential home buyer, or siding general contractor.

In one embodiment, a system is provided including a database that ingests data from disparate image sources, with a variety of image metadata types and qualities, and manages images geospatially through the creation and continued refinement of camera solutions for each data object. The camera solutions are calculated and refined by the database on the fly, through a combination of the application of image metadata toward image processing methods and the use of optical-only computer vision techniques. The database continually generates data quality metrics, which drive future collection analytics and tasking, as well as quality control requirements.

The techniques introduced here can be applied to any one of a number of types of 3D maps that provide accurate representations of building objects. In one embodiment, the 3D maps are created from data extracted from one 2D orthogonal image, two or more 2D oblique images, ground level images, aerial images, satellite, a digital elevation model or a combination thereof. Commonly assigned, U.S. Pat. No. 8,422,825, incorporated herein by reference in its entirety, provides additional example systems and methods of creating 3D maps/models.

FIG. 1 illustrates one embodiment of a system architecture of a three-dimensional map system 100. In one embodiment, 3D map system 100 includes an image processing system 102 and a map generation system 104. In other embodiments, the map generation system 104 and the image processing system 102 is coupled via a network channel 106. The image processing system 102 is a computer system for processing images in preparation for mapping the images to a 3D environment, for example, uses the computer system of FIG. 5. The map generation system 104 is a computer system for providing a 3D environment, for example, the computer system of FIG. 5.

The network channel 106 is a system for communication. In one embodiment, the network channel 106 encompasses a variety of mediums of communication, such as via wired communication for one part and via wireless communication for another part. In one embodiment, the network channel 106 is part of the Internet.

Network channel 106 includes, for example, an Ethernet or other wire-based network or a wireless NIC (WNIC) or wireless adapter for communicating with a wireless network, such as a WI-FI network. In other embodiments, the network channel 106 includes any suitable network for any suitable communication interface. As an example and not by way of limitation, the network channel 106 can include an ad hoc network, a personal area network (PAN), a local area network (LAN), a wide area network (WAN), a metropolitan area network (MAN), or one or more portions of the Internet or a combination of two or more of these. One or more portions of one or more of these networks may be wired or wireless. As another example, the network channel 106 can be a wireless PAN (WPAN) (such as, for example, a BLUETOOTH WPAN), a WI-FI network, a WI-MAX network, a 3G or 4G network, a cellular telephone network (such as, for example, a Global System for Mobile Communications (GSM) network).

In one embodiment, the network channel 106 uses standard communications technologies and/or protocols. Thus, the network channel 106 can include links using technologies such as Ethernet, 802.11, worldwide interoperability for microwave access (WiMAX), 3G, 4G, CDMA, digital subscriber line (DSL), etc. Similarly, the networking protocols used on the network channel 106 can include multiprotocol label switching (MPLS), the transmission control protocol/Internet protocol (TCP/IP), the User Datagram Protocol (UDP), the hypertext transport protocol (HTTP), the simple mail transfer protocol (SMTP), and the file transfer protocol (FTP). In one embodiment, the data exchanged over the network channel 106 is represented using technologies and/or formats including the hypertext markup language (HTML) and the extensible markup language (XML). In addition, all or some of links can be encrypted using conventional encryption technologies such as secure sockets layer (SSL), transport layer security (TLS), and Internet Protocol security (IPsec).

In one embodiment, the image process system 102 collects images uploaded from capture devices 108. The capture devices 108 are defined as electronic devices for capturing images. For example, the capture devices 108 includes a camera, a phone, a smart phone, a tablet, a video camera, a security camera, a closed-circuit television camera, a computer, a laptop, a webcam, a pair of electronic glasses, photosensitive sensors, an airplane mounted camera, vehicle mounted camera, satellite or any combination thereof. In some embodiments, the capture devices 108 is directly upload to the image process system 102 via the network channel 106, or indirectly upload the images. For example, the images are uploaded to a computer or a server first before being uploaded to the image process system 102. For another example, the images are transferred from a camera first to a networked computer, and then the images are transferred to the image process system 102.

In another embodiment, the image process system 102 processes the images collected and maps them to a specific building. In yet another embodiment, the image is also mapped on a particular surface or region of the building. The mapping is updated to a facade database in the map generation system 104. The map generation system 104, according to the mapping stored on the facade database, renders a 3D environment 110 for display on a viewer device 112. The 3D environment 110 is defined as a 3D map including virtual representation of physical world buildings. In another embodiment, the 3D environment 110 also includes 3D models of landscape and terrain.

The viewer device 112 is defined as a display device. For example, the viewer device 112 can be a computer with a monitor, a laptop, a touch screen display, a LED array, a television set, a projector display, a heads-up display, a phone, a smartphone, a tablet computer, a pair of electronic glasses or any combination thereof. In one embodiment, the viewer device 112 includes a computer system, such as computer system 500 of FIG. 5, for processing the 3D environment 110 for display.

Figure 2:
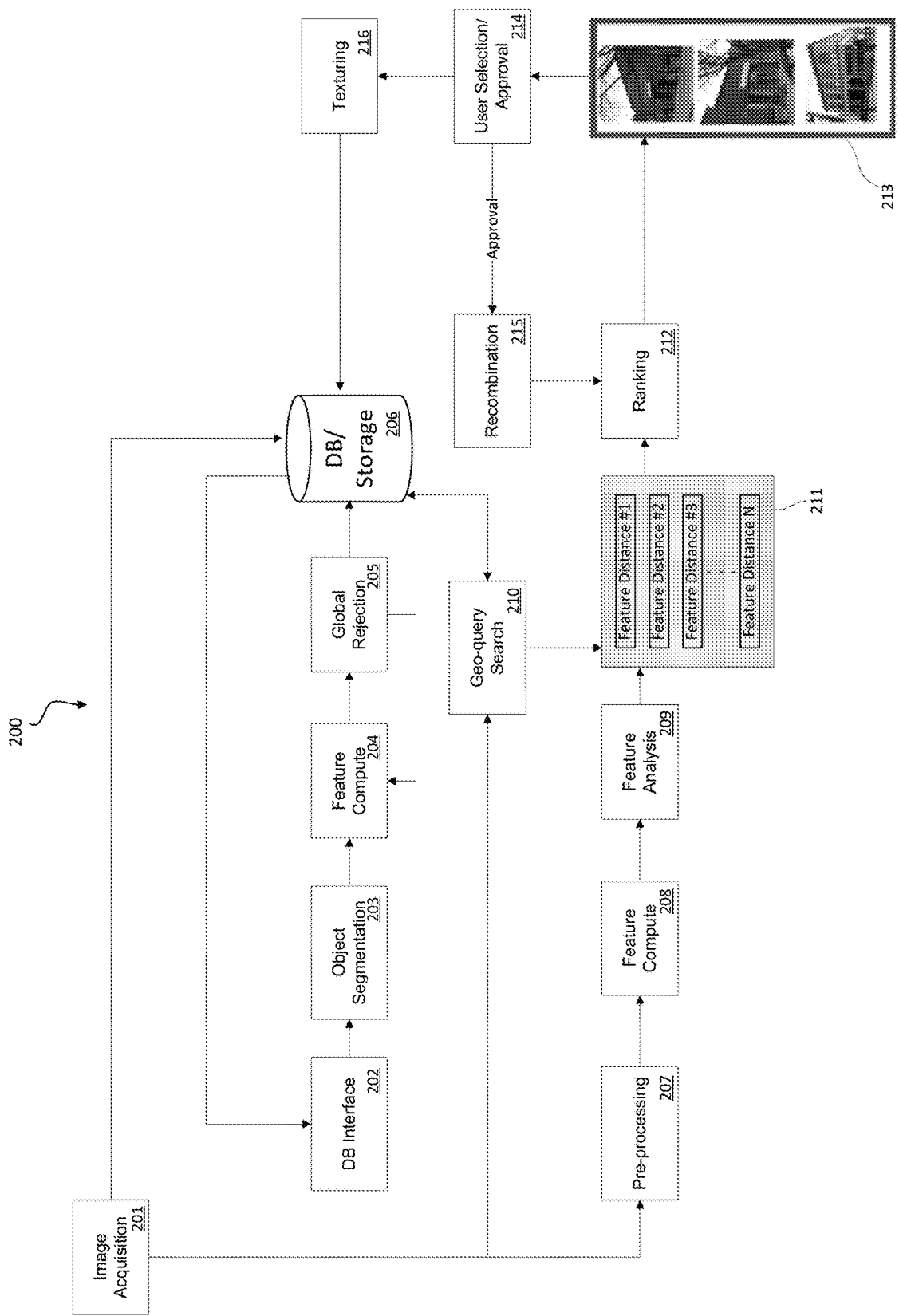
FIG. 2 illustrates one embodiment of a control flow of a computer vision database platform.

FIG. 2 illustrates one embodiment of a control flow of a computer vision database platform. In one embodiment, computer vision database platform 200 is part of the 3D map system 100 of FIG. 1. In another embodiment, computer vision database platform 200 is for mapping a consumer uploaded image to a particular surface of a building model associated with a physical building. Computer vision database platform 200 is a computer system with at least one processor and one non-transitory memory. In certain embodiments, computer vision database platform 200 is the image process system 102 of FIG. 1. In alternative embodiments, the image mapper system 200 is a computer system of FIG. 5.

In one embodiment, computer vision database platform 200 includes one or more methods of mapping a consumer uploaded image. The one or more methods are implemented by components, storages, and modules described below. In certain embodiments, the modules are implemented as hardware modules/components, software modules, or any combination thereof. For example, the modules described can be software modules implemented as instructions on a non-transitory memory capable of being executed by a processor or a controller on a machine described in FIG. 5.

The storages or "stores", described below are hardware components or portions of hardware components for storing digital data. Each of the stores can be a single physical entity or distributed through multiple physical devices. Each of the stores can be distributed through multiple physical devices both locally as well as remotely (e.g., server farms, cloud based servers, etc.). Each of the stores can be on separate physical device or share the same physical device or devices. Each of the stores can allocate specific storage spaces for run-time applications.

In one embodiment, a computer vision database platform system is provided for computing and managing content based image retrieval for generating 3D models. In another embodiment, the computer vision database platform provides for a database that is queried by various computer visions, image processing, and other algorithms. For example, the database ingests data from disparate image sources, with a variety of metadata types and qualities, and manages images geospatially through the creation and continued refinement of camera solutions for each data object included.

In one embodiment, the computer vision database platform system 200 is part of 3D map system 100 of FIG. 1. The computer vision database platform architecture provides for the management and analysis of images using training analysis, query analysis, comparison metrics, and recombination and ranking sub-parts.

Real-time updating of building model facades requires the acquisition of up-to-date imagery. Referring now to FIG. 2, image acquisition module 201 provides for collecting collected images. Image acquisition module 201 accepts images and image metadata from many sources, including but not limited to: orthographic and oblique aerial and satellite imagery, terrestrial vehicular-collected imagery and terrestrial mobile user imagery (e.g., crowdsourced) from smartphone cameras, wearable cameras, other digital cameras, web-cams, security footage and other camera systems. When a collected image is captured by a device, metadata associated with the image is also collected. The metadata includes, for example, global positioning system (GPS), compass, accelerometer information, physical descriptions, address, directions, known map position or any combination thereof.

In one embodiment, a user interface is provided allowing the user to input additional metadata. For example, not all devices have GPS built-in to the device so the user provides the GPS details in the user interface to be provided along with the image data to the image acquisition module 201.

Images are processed by the computer vision database platform to determine if the collected image should replace an existing image for a building object. Collected images are provided by image acquisition module 201 to pre-processing module 207 where the image is processed to remove certain obstructions from the image. Obstructions, for example, include mobile objects such as vehicles, pedestrians, posters, or any combination thereof and background features, such as landscaping, skyscapes, foliage, environmental elements (e.g., rain, fog, smoke), civil infrastructures or any combination thereof. In one embodiment, the removal process is done semi-automatically. For example, the image is shown to a viewer or a trained professional with segmentations overlaid on a display. The viewer or trained professional can then select the segmentations that are considered as obstructions for removal.

Pre-processing module 207 is based on a geometric classifier for obstructions of the collected image. For example, the collected image is processed by the classifier to identify two pedestrians, one car, and two trees. After the obstructions are classified by the geometric classifier, pre-processing module 207 further determines whether an obstruction of the type exists by, for example, a support vector machine for the particular type of the obstruction. Other machine learned models can be used for detecting the obstruction, such as heuristics, mixture models, Markov models, or any combination thereof. These models used can also calculate the statistical probability that an obstruction of the type exists. In one embodiment, a statistical threshold is implemented to make a decision of whether the obstruction should be removed.

Collected images are sent from pre-processing module 207 to feature compute module 208. Feature compute module 208 processes the image to identify various elements of the image. Not all collected images are provided with enough metadata to determine elements and features of the image. Optical-only computer vision techniques are used to identify elements and features of the collected images. For example, feature compute module 208 identifies doors, windows, signs and other architectural features of the collected image to collect information that can be used to compare the collected images with existing images. In one embodiment, elements and features of a collected image are identified by comparing them to a repository of known elements and features.

In other embodiments, new features and elements are added to the repository when it is confirmed that they are properly identified. For example, a collected image contains a door that was not previously identified. However, during image processing, the door was identified as a potential element or feature. During review, a reviewer would provide confirmation of the newly identified element or feature and it would be added to the repository of elements and features for future computing.

Feature analysis module 209 uses the features established by feature compute module 208 along with visual cues and camera solutions to determine additional metadata details for the collected image such as location and orientation information. For example, a total count of features established by feature compute module 208 is combined with the features' distribution and view point estimations calculated by camera solutions of feature analysis module 209 aid the system in identifying existing images within database 206 for comparison and ranking.

In one embodiment, camera solutions provide for camera orientation information of the collected images. For example, crowdsourced façade images collected from various sources are often provided with inaccurate location and/or directional information. The camera solutions within feature analysis module 209 provide estimates for the orientation and location of the collected image using visual cues within the image, gyrometric information (if available), view point estimations (i.e., vanishing point calculations), or other known methods of gathering camera orientation and/or location information. The technology described herein provides for camera solutions that are refined by the system as additional images are processed.

In one embodiment, the comparison metric sub-part compares the collected image and metadata information established in the query analysis sub-part to existing images stored in database 206. Comparison metric sub-part includes geo-query search module 210 that compiles sorted list 211 of images based on the metadata of the collected image. Geo-query search module performs a content based analysis to find the most similar facades in database 206 to the collected image. For example, the location information of the collected image is used to create a boundary box (i.e., location within 100 m radius) that the query search module 210 will use to search database 206 for similar images 213. Sorted list 211 compiles a list of the collected image and similar images collected from the database for comparison.

The facades of neighboring buildings in the database are ranked according to their similarity in the recombination and ranking sub-part. Ranking module 212 ranks the images based on similarity. In one embodiment, the ranking is based on texture, color, other means of classification based on image property, or any combination thereof. A ranked list 212 is provided to the user selection/approval module 214 where the user/system approves the top image or selects an alternative image. In one embodiment, the system approves the top ranked image and the building model is textured accordingly. In alternative embodiments, the user selects an image from the list that is not the top ranked image. The building model is textured in texturing module 216 according to the user's selection. Additionally, the ranked images are revised according to the selection and recombination module 215 adjusts the weighting of to account for the selection and guide future image ranking. In one embodiment, the adjustment of the weighting is done semi-automatically. For example, the selected image is shown to a reviewer or a trained professional with other similar images on a display and decides how to adjust the weighting based on the selected image.

The training analysis sub-part includes pre-processing module 203 which provides for object segmentation from the images where the image is processed to identify certain features of the image that represent non-façade data. For example, the object segmentation module 203 identifies foliage from the image that causes an obstructed view of the building façade. Other obstructions include mobile objects such as vehicles, pedestrians, posters, or any combination thereof and background features, such as landscaping, foliage, skyscapes, rain, fog, smoke, civil infrastructures or any combination thereof. In one embodiment, the removal process is done semi-automatically. For example, the image is shown to a viewer or a trained professional with segmentations overlaid on a display. The viewer or trained professional can then select the objects that are considered as obstructions for removal. The training analysis sub-part adapts to new features and quality metrics, which drive future collection analytics and all human quality control requirements.

Following pre-processing, feature compute module 204 processes the image to determine additional information. For example, not all regions of the collected images are identified or they are incorrectly identified. In one embodiment, feature computer module 204 provides region matching of the image in order to identify the regions of the collected images. Each region in the image can be defined based on heuristics of what a regular feature on a façade looks like. A computer vision approach is used to identify descriptors (unique or specific visual features for regions of each image) for each region of a collected image. For example, uniqueness of color is often used as a descriptor for a region of an image. Other descriptors include shapes, motion, and texture. The identified descriptors are utilized to correlate similar images. For example, database 206 includes a repository of stored images that have already been processed and associated with a 3D building model. In one embodiment, descriptors from the collected images are used to correlate the collected image with stored images based on statistical probability that the images are the same. If a correlation exists, related metadata from the stored image is shared with the collected image. The new metadata associated with the collected image is sent to global rejection module 305 where non-façade data determined by object segmentation are removed before stored in database 206.

Each region of the correlated stored image is matched against each region in the collected image. In one embodiment, the region matching can occur such that even if the camera conditions (e.g., angle, distance, focus, etc.) of the collected image are different from the stored image, the collected image is stretched in such a way that regions of the collected image are still mapped. Matched regions are annotated as being mapped to each other and saved and reflected database 206.

The computer vision platform system 200 can include one or more methods of mapping an image. The one or more methods can be implemented by components, storages, and modules described below. The modules can be implemented as hardware modules/components, software modules, or any combination thereof. For example, the modules described can be software modules implemented as instructions on a non-transitory memory capable of being executed by a processor or a controller on a machine described in FIG. 5.

Each of the modules can operate individually and independently of other modules. Some or all of the modules can be combined as one module. A single module can also be divided into sub-modules, each performing separate method step or method steps of the single module. The modules can share access to a memory space. One module can access data accessed by or transformed by another module. The modules can be considered "coupled" to one another if they share a physical connection or a virtual connection, directly or indirectly, allowing data accessed or modified from one module to be accessed in another module.

Figure 3:
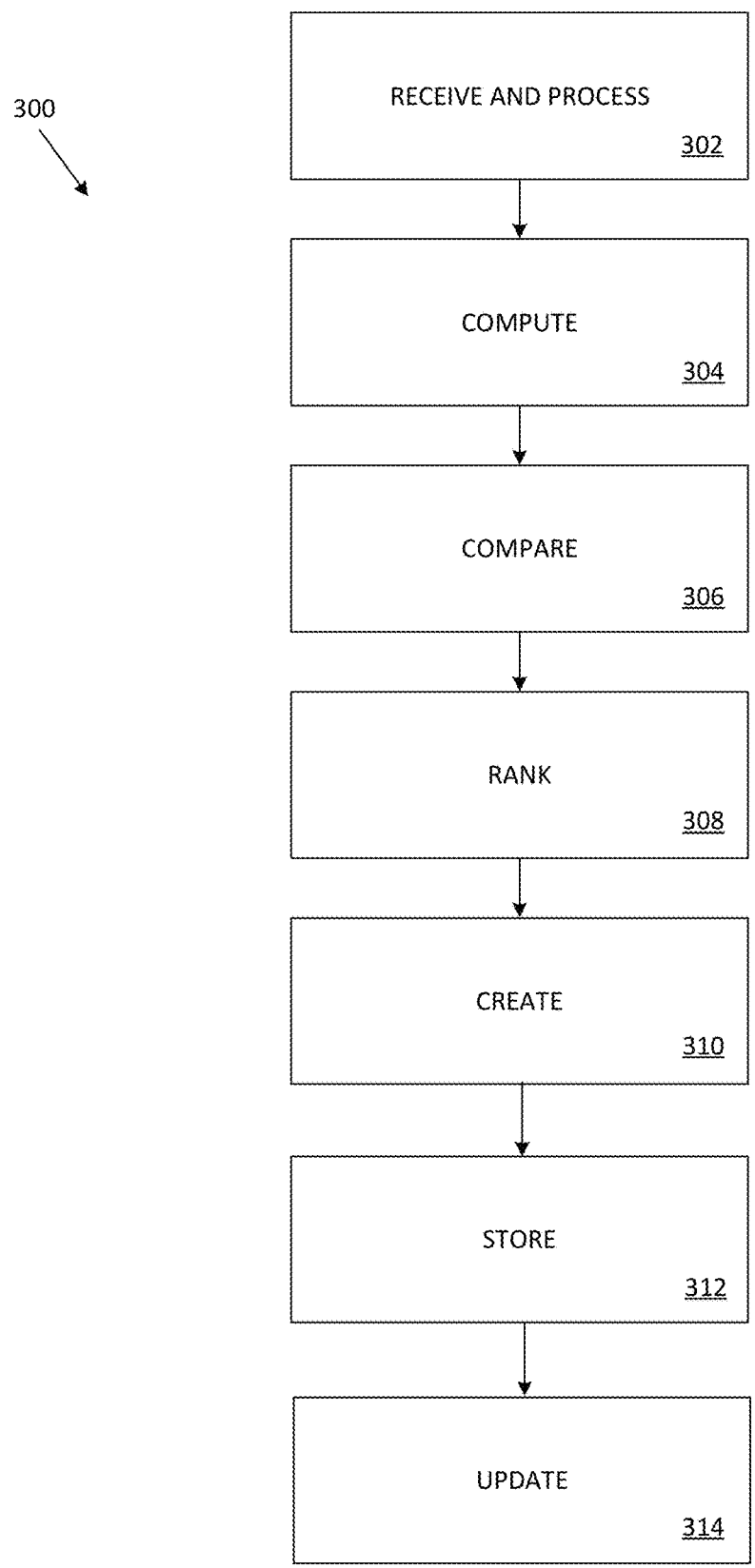
FIG. 3 illustrates one embodiment of a flow chart of a method of real-time updating of 3D building models.

FIG. 3 illustrates one embodiment of a flow chart of a method of real-time updating of 3D building models. In one embodiment, method 300 is part of the 3D map system 100 of FIG. 1. The method includes receiving and processing collected images in step 302. Collected images are analyzed by the query analysis module where obstructions are removed and features are computed in step 304. Using the computed information along with camera solutions and optical-only computer vision techniques, feature analysis step 306 provides additional metadata for the collected images. Images stored in the database are retrieved based on query information of the collected image for comparison and ranking. For example, location information and computed features are used to query the database and retrieve similar images. Using the geospatial data and camera solutions described above, the pixels of the collected image now registered in 3D space are correlated to the pixels of the retrieved stored images. New pixels generated by the collected image are registered into the 3D scaffolding for maintaining a real-time representation of the 3D textures of a 3D building model.

The collected images and the stored images from the database are ranked in step 308. The ranked images are presented to the user/system for validation and confirmation. In one embodiment, the user/system is required to either approve the top ranked image or selected an alternative image. In step 310, a pixel-to-pixel correlation between the collected image and the selected image is created by iteratively aligning the pixels from the collected image to the pixels for the selected image. The selected image is stored into the database in step 312 along with all of the metadata associated and learned during processing. In step 314, the system updates the 3D textures of the 3D building model with a new façade if the selected image was different than the current building image. If the selected image was not the collected image, the collected image is stored in the database along with the associated metadata.

If the selected image is not the top ranked image the ranking, recombination algorithms must be adjusted to account for the selection criteria. In one system training embodiment, a user selects an image that is not the top ranked image; the user provides selection criteria along with the selection to indicate the reasons the selected image was chosen over the top ranked image. User selection criteria input includes, for example, orientation, obstruction, lighting, image quality, feature information of the selected image or any combination thereof. The computer vision database platform interprets the input and adjusts weightings accordingly for future automated image collection and ranking.

Figure 4:
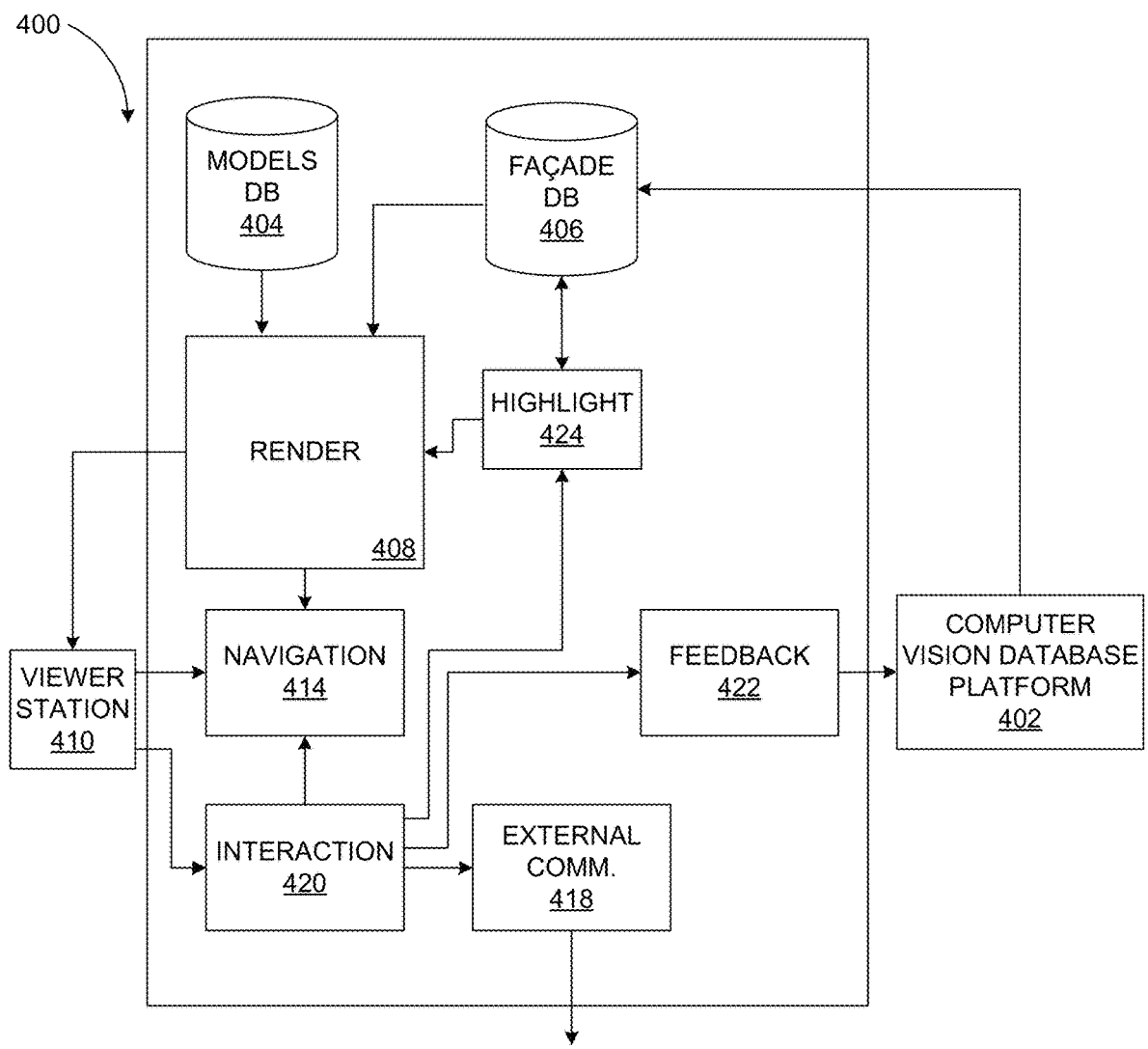
FIG. 4 illustrates one embodiment of a control flow of a map generation system.

FIG. 4 illustrates one embodiment of a control flow of a map generation system. In one embodiment, the map generation system 400 is part of the 3D map system 100 of FIG. 1. The map generation system 400 is for generating a 3D map from at least geo-coded facade corresponding to a 3D building model. The map generation system 400 is a computer system with at least one processor and one non-transitory memory. The map generation system 400 can be the map generation system 104 of FIG. 1. In alternative embodiments, the map generation system 400 is also on the same computer system as the image process system 102 of FIG. 1. In another embodiment, the map generation system 400 is computer system of FIG. 5.

In certain embodiments, the map generation system 400 includes one or more methods of generating a 3D map. The one or more methods are implemented by components, storages, and modules described below. In one embodiment, the modules are implemented as hardware components, software modules, or any combination thereof. For example, the modules described can be software modules implemented as instructions on a non-transitory memory capable of being executed by a processor or a controller on a machine described in FIG. 5.

In one embodiment, each of the modules operates individually and independently of other modules. In certain embodiments, some or all of the modules are combined as one module. A single module can also be divided into sub-modules, each performing separate method step or method steps of the single module. In some embodiments, the modules share access to a memory space. In alternative embodiments, one module accesses data accessed by or transformed by another module. The modules can be considered "coupled" to one another if they share a physical connection or a virtual connection, directly or indirectly, allowing data accessed or modified from one module to be accessed in another module.

The storages or "stores", described below are hardware components or portions of hardware components for storing digital data. Each of the storage can be a single physical entity or distributed through multiple physical devices. In one embodiment, each of the storage is on separate physical device or share the same physical device or devices. Each of the stores, for example, allocates specific storage spaces for run-time applications.

The map generation system 400 can include additional, fewer, or different modules for various applications. Conventional components such as network interfaces, security functions, load balancers, failover servers, management and network operations consoles, and the like are not shown so as to not obscure the details of the system.

The map generation system 400 can be coupled to computer vision database platform 402. The image process system 402 is a computer system for processing images, such as the image process system 102 of FIG. 1.

In one embodiment, the map generation system 400 includes a models database store 404. The models database store 404 is a store on the map generation system 400 for storing building models for use in the overall 3D map system.

In one embodiment, the map generation system 400 includes a render module 408. The render module 408 is for generating a 3D map environment. For example, the render module 408 can generate the 3D map by rendering building models for displaying on a viewer station 410.

In one embodiment, the map generation system 400 includes a navigation module 414. The navigation module 414 is for traversing through the 3D map environment generated by the render module 408. For example, a user operating the viewer station 410 can use arrow keys or mouse to move about the 3D map environment that is rendered in real-time. In certain embodiments, the viewer station 410 displays representations of physical buildings in different perspective as the user navigates from different perspective position and direction in the 3D map. The navigation module 414 facilitates that navigation and coordinates the re-rendering of the building models and the facades.

In one embodiment, the render module 408 includes a widget module 416. Widget module 416 is for providing a widget alongside or on a facade. For example, the widget module can communicate with a social network via an external communication module 418. In other embodiments, the widget module displays a feed of a page on the social network on a facade of a building model, wherein the page is for the tenant of the physical building represented by the building model.

In one embodiment, the map generation system 400 includes an interaction module 420. The interaction module 420 is for processing and recording interactions received from the viewer station 410. For example, the interaction module 420 can serve multiple functions. The interaction module 420 can serve to receive inputs from the viewer station 410 about the direction and position of the 3D map to traverse to. In this example, the interaction module 420 can be coupled to the navigation module 414 to re-render the 3D map for the viewer station 410.

The interaction module 420 can also receive inputs from the viewer station 410 to interaction with an external system, such as a social network system, a communication service, or a point-of-interest website. In one specific example, the interaction module 420 can receive voice or text inputs for a user of the viewer station 410 to communicate through a communication portal provided by the widget module 416.

The interaction module 420 can further receive feedback inputs for the image process system 402. The feedback inputs can be processed by a feedback module 422. The user of the viewer station 410 can comment on or interact with items displayed on facades rendered by the mapper module 412. The user can also comment on or interact with the building models themselves. These comments and interactions can be piped back to the image process system 402 for processing. For example, the user can select a region of a facade to indicate that there is texture mismatch. The image process system 402 can then take that feedback to correct the mapping of the facade. The user can also provide an explanation of the texture mismatch.

In one embodiment, the map generation system 400 includes a highlight module 424. The highlight module 424 is for detecting changes in facades of building models, including specific regions or as a whole. In other embodiments, the highlight module 424 also coordinates with the render module 408 to highlight the region of the facade that has changed. As new facades for a building model is uploaded from the image process system 402, the highlight module 424 can analyze the new mapped photos to highlight the regions in those photos that are different from the previous versions of stored facades. In some embodiments, the region match module 220 of FIG. 2 provides the information about which regions of the facade has been changed.

In one embodiment, the highlight module 424 is used in a variety of applications. In certain embodiments, the detected change is used for inspection. This includes inspection of whether a building has been knocked down, a wall has been repainted. In one embodiment, the detected change is used for detecting patterns of change. For example, the highlight module 424 can indicate that the door of this building appears to open every day at 7 AM by recognizing a regional change of the facade image at the door of the building model. In some embodiments, the detected change further is used for user search and contextual information.

Figure 5:
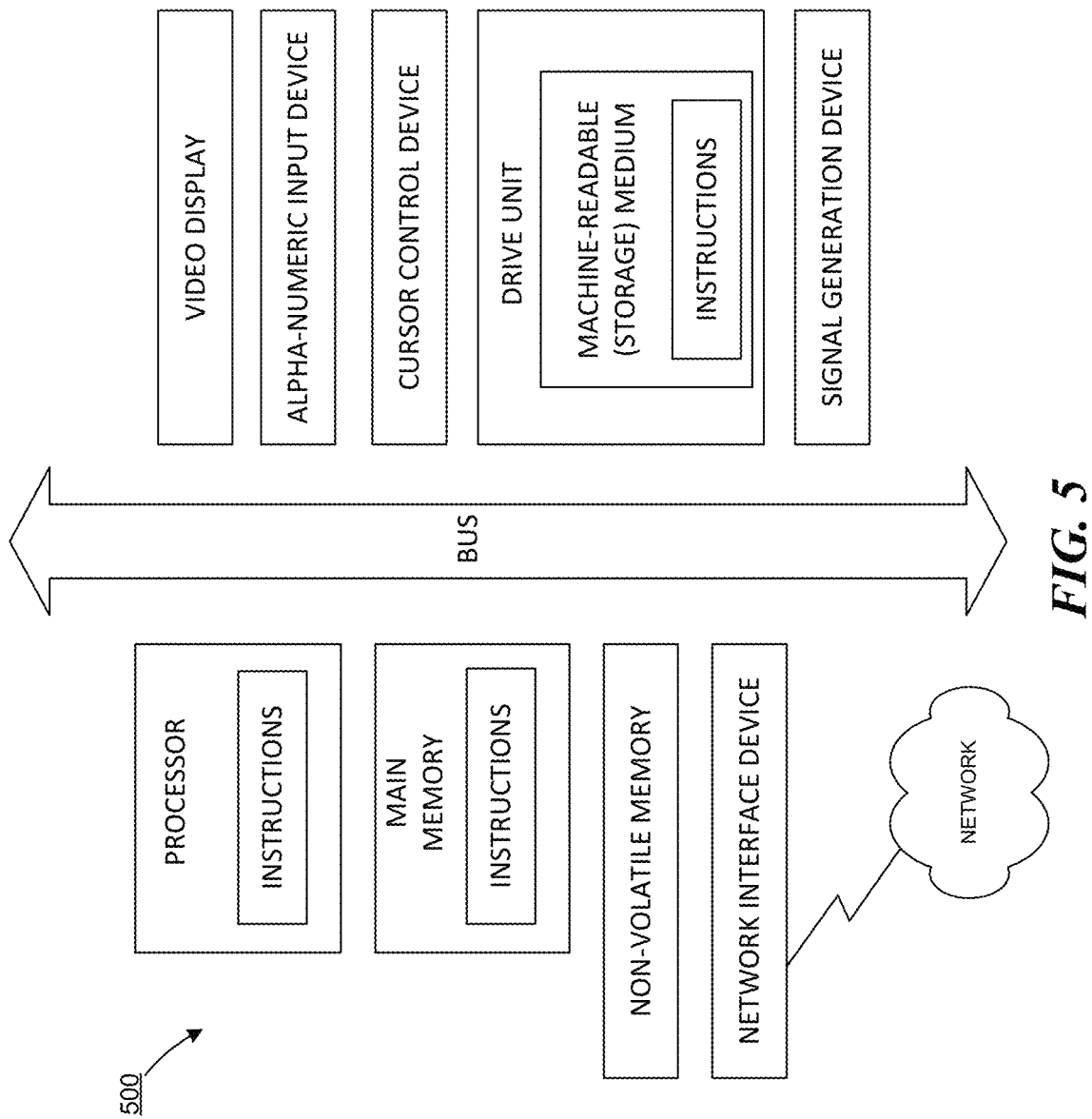
FIG. 5 illustrates one embodiment diagrammatic representation of an example computer system within which a set of instructions, for causing the machine to perform any one or more of the methodologies or modules discussed herein, may be executed.

Referring now to FIG. 5, therein is shown a diagrammatic representation of a machine in the example form of a computer system 500 within which a set of instructions, for causing the machine to perform any one or more of the methodologies or modules discussed herein, may be executed. Computer system 500 includes a processor, memory, non-volatile memory, and an interface device. Various common components (e.g., cache memory) are omitted for illustrative simplicity. The computer system 500 is intended to illustrate a hardware device on which any of the components depicted in the example of FIGS. 1-2 (and any other components described in this specification) can be implemented. The computer system 500 can be of any applicable known or convenient type. The components of the computer system 500 can be coupled together via a bus or through some other known or convenient device.

This disclosure contemplates the computer system 500 taking any suitable physical form. As example and not by way of limitation, computer system 500 may be an embedded computer system, a system-on-chip (SOC), a single-board computer system (SBC) (such as, for example, a computer-on-module (COM) or system-on-module (SOM)), a desktop computer system, a laptop or notebook computer system, an interactive kiosk, a mainframe, a mesh of computer systems, a mobile telephone, a personal digital assistant (PDA), a server, or a combination of two or more of these. Where appropriate, computer system 500 may include one or more computer systems 1100; be unitary or distributed; span multiple locations; span multiple machines; or reside in a cloud, which may include one or more cloud components in one or more networks. Where appropriate, one or more computer systems 500 may perform without substantial spatial or temporal limitation one or more steps of one or more methods described or illustrated herein. As an example and not by way of limitation, one or more computer systems 500 may perform in real time or in batch mode one or more steps of one or more methods described or illustrated herein. One or more computer systems 500 may perform at different times or at different locations one or more steps of one or more methods described or illustrated herein, where appropriate.

The processor may be, for example, a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory is coupled to the processor by, for example, a bus. The memory can include, by way of example but not limitation, random access memory (RAM), such as dynamic RAM (DRAM) and static RAM (SRAM). The memory can be local, remote, or distributed.

The bus also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer 500. The non-volatile storage can be local, remote, or distributed. The non-volatile memory is optional because systems can be created with all applicable data available in memory. A typical computer system will usually include at least a processor, memory, and a device (e.g., a bus) coupling the memory to the processor.

Software is typically stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory in this paper. Even when software is moved to the memory for execution, the processor will typically make use of hardware registers to store values associated with the software, and local cache that, ideally, serves to speed up execution. As used herein, a software program is assumed to be stored at any known or convenient location (from non-volatile storage to hardware registers) when the software program is referred to as "implemented in a computer-readable medium." A processor is considered to be "configured to execute a program" when at least one value associated with the program is stored in a register readable by the processor.

The bus also couples the processor to the network interface device. The interface can include one or more of a modem or network interface. It will be appreciated that a modem or network interface can be considered to be part of the computer system 500. The interface can include an analog modem, isdn modem, cable modem, token ring interface, satellite transmission interface (e.g., "direct PC"), or other interfaces for coupling a computer system to other computer systems. The interface can include one or more input and/or output devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device. For simplicity, it is assumed that controllers of any devices not depicted reside in the interface.

In operation, the computer system 500 can be controlled by operating system software that includes a file management system, such as a disk operating system. One example of operating system software with associated file management system software is the family of operating systems known as Windows® from Microsoft Corporation of Redmond, Wash., and their associated file management systems. Another example of operating system software with its associated file management system software is the Linux™ operating system and its associated file management system. The file management system is typically stored in the non-volatile memory and/or drive unit and causes the processor to execute the various acts required by the operating system to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The algorithms and displays presented herein are not inherently related to any particular computer or other apparatus. Various general purpose systems may be used with programs in accordance with the teachings herein, or it may prove convenient to construct more specialized apparatus to perform the methods of some embodiments. The required structure for a variety of these systems will appear from the description below. In addition, the techniques are not described with reference to any particular programming language, and various embodiments may thus be implemented using a variety of programming languages.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any machine capable of executing a set of instructions (sequential or otherwise) that specify actions to be taken by that machine.

While the machine-readable medium or machine-readable storage medium is shown in an exemplary embodiment to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding or carrying a set of instructions for execution by the machine and that cause the machine to perform any one or more of the methodologies or modules of the presently disclosed technique and innovation.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the invention to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

Those of skill in the art will appreciate that the invention may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative embodiments may perform routines having steps, or employ systems having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe the embodiments of the invention in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the invention may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the invention may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the invention be limited not by this detailed description, but rather by any claims that issue on an application based hereon. Accordingly, the disclosure of the embodiments of the invention is intended to be illustrative, but not limiting, of the scope of the invention, which is set forth in the following claims.

What is claimed is:

1. A method of detecting changes in facades of multi-dimensional building models comprises:
   receiving one or more collected images;
   mapping an image façade region of a selected image of the one or more collected images to at least one textured model façade of a multi-dimensional building model including:
      comparing the image façade region of a selected image to a plurality of textured model facades of the multi-dimensional building model based on common metadata between the selected image and the multi-dimensional building model;
      ranking the image façade region based on a similarity to the at least one textured model façade; and
      creating a pixel-to-pixel correlation between the image façade region of the selected image and a highest ranked textured model façade of the multi-dimensional building model;
      detecting at least one change in the highest ranked facade as from the image façade region identified during the pixel-to-pixel correlation; and
   retexturing and highlighting the highest ranked facade with the at least one detected change; and storing the retextured highest ranked facade in a database with new pixel registration data.

2. The method of claim 1, wherein the highlighting includes highlighting specific regions of the highest ranked façade or the highest ranked façade as a whole.

3. The method of claim 1 further comprises providing information about which regions of the highest ranked façade include the detected changes.

4. The method of claim 1, wherein the detected changes are used for building inspection.

5. The method of claim 4, wherein the building inspection reflects the detected changes including one more facades of a building associated with the multi-dimensional building models that have been knocked down.

6. The method of claim 4, wherein the building inspection reflects the detected changes including a repainted wall.

7. The method of claim 4, wherein the detected changes are used for detecting patterns of change.

8. The method of claim 4 further comprises providing a user search of the detected changes.

9. The method of claim 4 further comprises providing contextual information of the detected changes to a user.

10. The method of claim 1, wherein ranking the image façade region to the at least one model façade based on a similarity further comprises ranking based on a texture similarity.

11. The method of claim 1, wherein ranking the image façade region to the at least one model façade based on a similarity further comprises ranking based on a color similarity.

12. The method of claim 1, wherein ranking the image façade region to the at least one model façade based on a similarity further comprises ranking based on a feature similarity.

13. A method of detecting changes in building model façade textures comprising:
receiving an oblique image captured by a smartphone, the oblique image including one or more facades of a building;
processing regions of the oblique image to remove façade obstructions;
processing regions of the oblique image to identify architectural features of a selected facade within the regions as metadata associated with the received oblique image;
comparing the oblique image to a plurality of previously stored facades of multi-dimensional building models, the comparing including an analysis of architectural feature metadata;
ranking the comparing of the oblique image and the previously stored facades of multi-dimensional building models;
creating a pixel-to-pixel correlation between the oblique image and a highest ranked one of the previously stored facades of multi-dimensional building models;
detecting, based on the pixel-to-pixel correlation, changes between the one or more regions of the highest ranked one of the previously stored facades of multi-dimensional building models and the received oblique image;
graphically highlighting the changes from the received oblique image in one or more regions of the highest ranked one of the previously stored facades; and
updating a texture of the highest ranked one of the previously stored facades with the changes in the one or more regions from the received oblique image, including the graphical highlighting and updated metadata in a multi-dimensional building model database.

14. The method of claim 13, wherein ranking the comparing of the oblique image and the previously stored facades of multi-dimensional building models further comprises ranking based on a texture similarity.

15. The method of claim 13, wherein ranking the comparing of the oblique image and the previously stored facades of multi-dimensional building models further comprises ranking based on a color similarity.

16. A method of detecting changes in building model facade textures comprising:
receiving an oblique image captured by a smartphone, the oblique image including one or more facades of a building;
processing regions of the oblique image to identify architectural features of a selected facade within the regions as metadata associated with the received oblique image;
comparing the oblique image to a plurality of previously stored facades of multi-dimensional building models, the comparing including an analysis of common metadata;
ranking the comparing of the oblique image and the previously stored facades of multi-dimensional building models;
creating a pixel-to-pixel correlation between the oblique image and a highest ranked one of the previously stored facades of multi-dimensional building models;
detecting, based on the pixel-to-pixel correlation, at least one change between the one or more regions of the highest ranked one of the previously stored facades of multi-dimensional building models and the received oblique image; and
updating a texture of the highest ranked one of the previously stored facades with the at least one change in the one or more regions from the received oblique image, including the graphical highlighting and updated metadata in a multi-dimensional building model database.

17. The method of claim 16, wherein ranking the comparing of the oblique image and the previously stored facades of multi-dimensional building models further comprises ranking based on a texture similarity.

18. The method of claim 16, wherein ranking the comparing of the oblique image and the previously stored facades of multi-dimensional building models further comprises ranking based on a color similarity.

* * * * *